(12) United States Patent
Firlik et al.

(10) Patent No.: US 9,785,424 B2
(45) Date of Patent: Oct. 10, 2017

(54) CAPABILITY ATTRIBUTES BASED APPLICATION PACKAGING

(71) Applicant: Apple Inc., Cupertino, CA (US)

(72) Inventors: Donald Matthew Firlik, Cupertino, CA (US); Patrick O. Heynen, Redwood City, CA (US); David Makower, Milpitas, CA (US); Andrew D. Boyko, Belmont, CA (US); Anders Bertelrud, Burlingame, CA (US); Christopher T. Parker, Mountain View, CA (US); Paul William Chinn, San Jose, CA (US); Robert Marini, San Francisco, CA (US); Eric Olaf Carlson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 14/732,610

(22) Filed: Jun. 5, 2015

(65) Prior Publication Data

US 2016/0357536 A1    Dec. 8, 2016

(51) Int. Cl.
    *G06F 9/445*  (2006.01)
    *H04L 29/08*  (2006.01)
    *G06F 9/54*   (2006.01)

(52) U.S. Cl.
    CPC .......... *G06F 8/61* (2013.01); *G06F 9/54* (2013.01); *H04L 67/34* (2013.01)

(58) Field of Classification Search
    CPC ..... G06F 8/60; G06F 8/61; G06F 8/64; G06F 8/65; G06F 9/44; G06F 9/445; H04L 67/04; H04L 67/10; H04L 67/42; H04L 67/125; H04L 67/1095

USPC ........................................................ 717/175
See application file for complete search history.

(56) References Cited

U.S. PATENT DOCUMENTS

| | | | |
|---|---|---|---|
| 7,966,428 | B2 | 6/2011 | Jalon |
| 8,356,117 | B2 | 1/2013 | Jalon |
| 8,468,498 | B2 | 6/2013 | Lee et al. |
| 8,713,558 | B2 | 4/2014 | Vidal et al. |
| 8,863,077 | B2 | 10/2014 | Lee et al. |

(Continued)

FOREIGN PATENT DOCUMENTS

WO    WO 2014/193463 A1    12/2014

OTHER PUBLICATIONS

PCT International Search Report and the Written Opinion of the International Searching Authority for PCT/US2016/025056 mailed May 25, 2016.*

*Primary Examiner* — Wei Zhen
*Assistant Examiner* — Mohammed Huda
(74) *Attorney, Agent, or Firm* — Blakely, Sokoloff, Taylor & Zafman LLP

(57) ABSTRACT

A method and an apparatus for an application thinning mechanism are described. The thinning mechanism can select a subset of components from a universal application to assemble an application variant to be distributed and installed to a specific type of devices. The universal application may include every component, such as asset, resource or executable, built/developed for targeted device attributes to install one common application to multiple devices. For example, the thinning mechanism can use a trait vector associated with a type of devices to iterate through the components and identify assets to be included or packaged into in each target device specific application or application variant.

20 Claims, 7 Drawing Sheets

(56) References Cited

U.S. PATENT DOCUMENTS

| | | | |
|---|---|---|---|
| 9,009,696 B2 | 4/2015 | Vidal et al. | |
| 2006/0265489 A1* | 11/2006 | Moore | H04L 69/40 |
| | | | 709/223 |
| 2008/0052704 A1 | 2/2008 | Wysocki | |
| 2009/0063624 A1* | 3/2009 | Nordstrom | H04M 1/72525 |
| | | | 709/203 |
| 2010/0077475 A1 | 3/2010 | Deschenes et al. | |
| 2013/0165222 A1 | 6/2013 | Wysocki | |
| 2014/0115056 A1 | 4/2014 | Makower et al. | |
| 2014/0359606 A1* | 12/2014 | Salameh | G06F 8/61 |
| | | | 717/178 |
| 2014/0372998 A1 | 12/2014 | Salameh et al. | |

* cited by examiner

500

Providing a package of components for installing an application to different types of devices, wherein a collection of attributes characterize properties of the types of devices, each component associated with a set of component traits, each component trait indicating an attribute value for one of the attributes, each type of devices characterized by a set of device traits, each device trait indicating an attribute value for one of the attributes, the package of components including a particular group of components
501

Identifying a subset of the package of components for an application variant to install the application to a particular one of the different types of devices, the particular type of devices characterized by a particular set of device traits, wherein one component within the particular group of components is required to install the application to each of the different types of devices, wherein the subset of components include one component selected from the particular group of components to best match the particular set of device traits of the particular type of devices within the particular group of components
503

Storing the application variant including the subset of components in a data store, the application variant indexed by the particular set of device traits in the data store
505

Sending the application variant to a device from the data store, the device characterized by the set of device traits
507

Fig. 5

CAPABILITY ATTRIBUTES BASED APPLICATION PACKAGING

FIELD OF INVENTION

The present invention relates generally to application packaging. More particularly, this invention relates to building and distributing application resources and/or executables based on capability attributes of target devices.

BACKGROUND

Retail software applications are typically developed or built to run across a range of different types of devices. For example, an application may be configured to support most popular types of devices to broaden potential customer bases. Optionally, an application may be designed to run on the latest type of devices to take advantage of newly available system features, such as graphics capabilities but such an application may not run or run properly on older devices which do not include such newly available features.

Further, more than one versions of a single application component may be packaged together to allow one installable application to support multiple types of devices. As an example, multiple image files may be provided to support a same user interface element rendered for running the application in target devices. These image files may differ in textures, compression formats, resolutions or other applicable graphic features related to capabilities of the target devices. Each image file may be applicable in different types of the devices.

As a result, an application package may include components applicable for running an application in certain types of devices but not in other types of devices. A developer may need to pick which types of devices to support for packaging related components into an application. Furthermore, the size of an application package to be installed in a target device may increase as the number or range of types of target devices increases.

Therefore, traditional mechanisms for application packaging and installation may be inefficient, wasteful and not developer friendly.

SUMMARY OF THE DESCRIPTION

An application thinning mechanism can select (or pick) a subset of components from a universal application to assemble an application variant to be distributed and installed to a specific type of device(s). The universal application may include every component, such as asset, resource or executable, built/developed for targeted device attributes to allow installing the application to multiple types of devices based on one common application package.

The thinning mechanism can reduce the size of or thin down (e.g. by removing certain application components) the universal application for a target type of devices. For example, the thinning mechanism (e.g. tool) can use a trait vector (e.g. a set of device attributes) associated with a type of devices to iterate through the components (e.g. an asset catalog in the application package) and identify assets to be included or packaged in each target device specific application or application variant (while excluding other assets that are designed for use on other devices).

Components in a universal application package may include executables (or intermediate code) and/or assets to allow an associated application to be installed into multiple types of target devices. Assets may be stored in an asset catalog. The assets can be application data accessed during runtime of the application, such as image files, shaders, textures, or other applicable data resources, etc. Each asset may be developed/designed to target certain device capabilities or device traits, for example, represented via a key associated with the asset. The intermediate code can be, for example, an intermediate representation of code that is created (e.g. compiled) from a source code but is not executable, and a further compilation can create a plurality of executable applications for a corresponding plurality of different devices.

The thinning mechanism can allow an application to be built or developed for one or more device capabilities instead of targeting specific devices. There may be no need for a target specific application to be submitted from a development machine (or a developer). An application store (or server) can receive an application submission, such as an asset catalog and/or a universal application (in either an executable format or in an intermediate code format) and build a device-specific application according to a specific trait vector representing a targeted device via the thinning mechanism. A trait vector can include an arbitrary number of traits or device capabilities characterizing attributes of the device, such as display scale factor, screen sizes, idioms or device family identifiers, information related to processor capabilities, performance class, memory, system architectures, types of sensors (e.g. motion sensors) etc.

In one embodiment, a package of components for installing an application to different types of devices may be provided. A collection of attributes may be applicable to characterize properties of these types of devices. Each component may be associated with a set of component traits. Each component trait can indicate an attribute value for one of the attributes. For example, component can have a component trait=X and tie it back to the attribute value.

Each type of devices may be characterized by a set of device traits. Each device trait can indicate an attribute value for one of the attributes. For example, a device type can have a device trait=X and tie it back to the attribute value used above. The package of components may include a particular group of components. A subset of the package of components may be identified for selecting an application variant from the package to install the application to a particular type of devices characterized by a particular set of device traits. At least one component within the particular group of components may be required to install the application to each type of devices. The subset of components may include one component selected from the particular group of components to best match the particular set of device traits of the particular type of devices within the particular group of components. The application variant including the subset of components may be stored in a data store indexed by the particular set of device traits. The application variant may be sent to a device from the data store according to the set of device traits which characterize the device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 is a flow diagram illustrating one embodiment of a process to generate an application variant from a universal application package;

DETAILED DESCRIPTION

Figure 1:
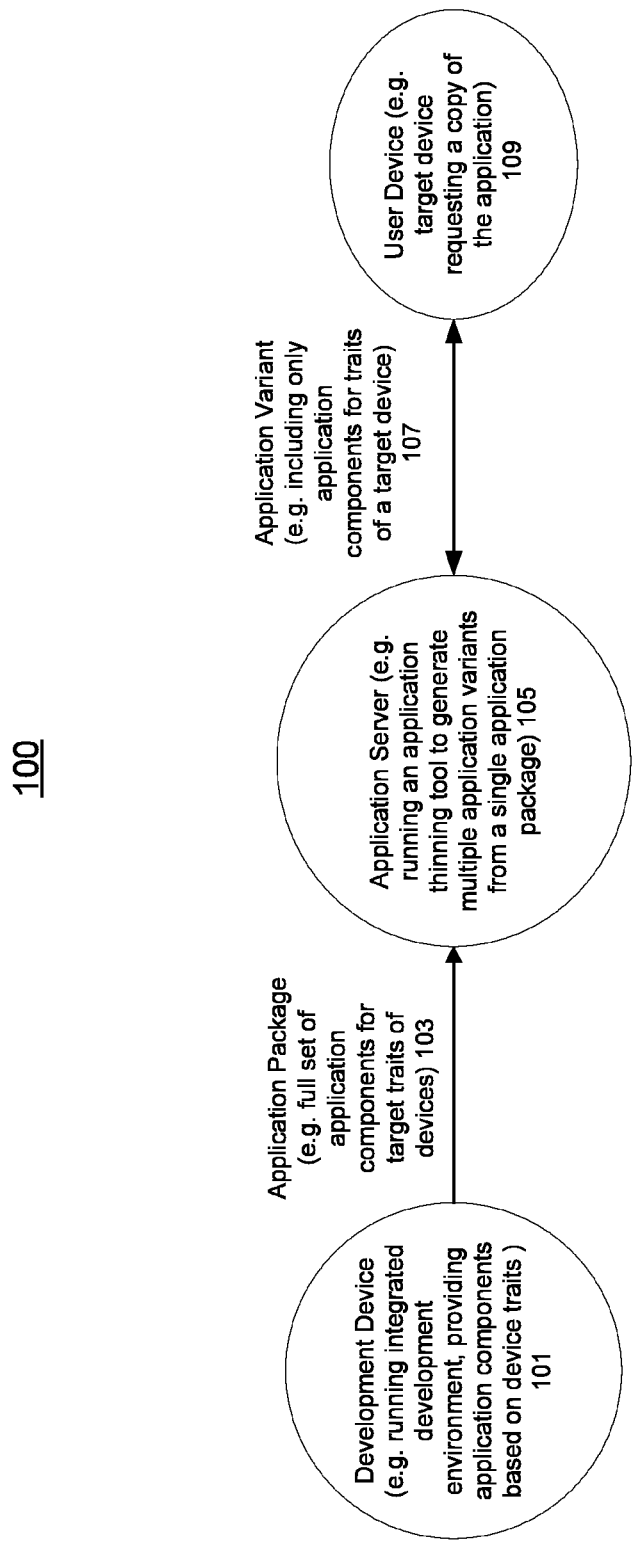
FIG. 1 is a distribution diagram illustrating thinning a submitted application based on device traits for distribution.

Methods and apparatuses for device attributes based application packaging are described herein. In the following description, numerous specific details are set forth to provide a thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, an application thinning mechanism can automatically adapt or repackage a universal application as an application variant for installing an application to a specific type of target devices without a need to install the full universal application to the target devices. The universal application may include application components designed or developed to support a variety of device capabilities. The thinning mechanism can tailor applications for specific target device capabilities and have the applications include only the necessary resources for the specific target devices instead of distributing the universal application.

For example, depending on a specific set of device capabilities associated with a target device, the application thinning mechanism can package a subset of the components from the universal application for the application variant to be installed to the target device for the application. The rest of components (e.g. not identified for the application variant or filtered out) in the universal application may not be installed to the target device.

The thinning mechanism can allow an application variant to be optimally or specifically packaged for each target device independently for installing an application. The application variant can include application components tailored to a target device based on, for example, device capabilities or attributes of this target device. A developer may provide application components supporting a variety of device capabilities without a need to consider a size constraint of one universal application installed with all the application components to support multiple types of devices.

New or additional application variants may be generated based on an originally submitted application package (e.g. from a developer) to provide automatic support for new devices or changes of existing devices. For example, the thinning mechanism can receive new device capabilities associated with these devices and assemble application components for new application variants to install or update the application to these devices. A user device may send a refresh request to an application store to perform an application update which may download a corresponding application variant generated on demand or previously archived via the thinning mechanism (e.g. a software tool).

In one embodiment, the thinning mechanism may include knowledge (e.g. rules, setting or configurations) to identify matching application components for a device capability or a combination of device capabilities, for example, represented via traits. Even when no matching ones are available, the thinning mechanism can heuristically determine (or guess) best matches to select which application components to assemble for an application variant.

Traits may represent attribute values for a collection of attributes describing hardware and/or software capabilities of a user device or potential future user device (e.g. a phone device, a mobile device or other applicable device to host an application). Each attribute may be associated with a set of values or a range of values, such as numerical values, character names, or other applicable values. Comparable relationships may be defined among the attribute values to allow matching comparisons, similarity comparison or other applicable comparisons.

Examples of traits may indicate device capabilities related to display screen resolutions, processor family names, device idioms (e.g. model names), network protocols supported (e.g. Wi-Fi, USB2, automobile connections, etc.), number of audio channels supported, GPS (global position system) or other location capabilities, specific sensor capabilities (e.g. gyroscope sensor, heart rate sensor, or other applicable sensors), special processors (e.g. graphics processor, health processor, motion processor or other applicable special-purpose processors), system software names, memory capacity, sets of feature capabilities, or other applicable attributes. A set of feature capability, such as a graphics features set class, may indicate a combination of hardware linked features (e.g. graphics processor and graphics libraries) which are enabled in a device. The list of applicable attributes for the thinning mechanism may be extendable and/or configurable to accommodate the continuous evolution of target devices.

The thinning mechanism can allow building an application based on a set of hardware linked feature capabilities (such as Metal graphics capabilities of devices). The need to catalog assets by specific devices or chipsets may be avoided via the thinning mechanism. As a result, the thinning mechanism can improve robustness of the code and resources developed for an application in the face of new devices with new processors which may be unknown to the developer, but which share feature capabilities which the application may already have been organized around (e.g. known to the developer).

Traits may have dependency relationships among each other. Alternatively, certain traits may be selected independently. For example, a device idiom trait may indicate a type of small mobile devices, desktop window environments, tablet screen area usage or other applicable classification of devices, etc. Thus an overall application user interface layout may be optimized according to the device idiom trait. Traits related to memory sizes may be correlated to performance traits. Architecture traits and/or system traits (e.g. which graphics libraries used) may be tied to which assets to be used (or accessed) by the application. The thinning mechanism can consider relationships and/or constraints among different available application components to select application components for a trait vector of a target device.

In one embodiment, an application can be packaged as a structured data for submission and/or distribution. For example, application components may be carried in an application catalog including one or more buckets. A bucket may carry different varieties of one application component, each associated with different traits or attribute values of device capabilities. For example, an image resource bucket may include multiple image files each supporting different screen resolutions. In some embodiment, a file (e.g. asset, resource or code) in a bucket may be named according to the associated device capabilities (e.g. imagename1x.png, imagename2x.png, imagename3x.png, etc.).

A universal application may correspond to an application catalog with each bucket carrying one or more implementations (e.g. designs, drawings, graphics, media files, data files or executables) of one application component. These implementations may be provided by the developer(s) of this universal application. An application variant may correspond to a thinned down or light version of application catalog with each bucket carrying at most a selected one of the variety of application component of the universal application.

Application components may be designed or developed based on capability choices or traits instead of specific device choices. Traits may be specified via an API (Application Programming Interface) model in a simple and manageable manner to allow developers to make individual capability choices for application components. The thinning mechanism can identify a best mapping between available application components and a target device which may be characterized by a trait vector. The thinning mechanism can extend application components (e.g. assets) of an application to new devices which did not exist when the application was built.

In some embodiments, traits associated with an application or an application component may be specified to exclude devices with certain device capabilities. A universal application may be packaged to target devices excluding a certain class of types of devices. For example, an application may be built not to be shipped to devices without a specific graphics feature set/capabilities. The thinning mechanism may generate application variants which are not associated with trait vectors of the excluded devices.

Devices may be represented via a trait matrix of corresponding trait vectors. The trait matrix may be kept up to date with changes in device capabilities, possible attribute values, and/or development of new devices and/or changes in existing devices. In some embodiment, a device may be cloned or masqueraded to be a different device via a trait vector. Traits may be mixed and matched with a much larger set of combinations then an actual set of existing devices. Applications can be built according to traits decoupled from being constrained by currently available target devices.

In one embodiment, during build time, the thinning mechanism can provide guidance to build applications targeting (and/or limiting, excluding) devices with certain device capabilities. The thinning mechanism can generate an applicant variant to be tested on a test device. A special flag may be applied to enable the thinning mechanism to generate only one application variant for testing purposes. During thinning time, the thinning mechanism can pre-generate application variants to be installed into a variety of devices according to device capabilities specified as packaged in the application deployed to an application store.

During runtime, system code of a device running the application may transparently determine which application components (e.g. which icon, which image resolution) installed in the device are most suitable for the device capabilities provided. In one embodiment, the thinning mechanism can make selection decisions which produce an identical or substantially identical result as the system code running in the device. In other words, if the device is installed with a universal version of this application, the system code can make runtime decisions to access a subset of application components for running the application to produce an identical result as if the device is installed with an application variant via the thinning mechanism for running the application. The thinning mechanism and the device system code may include common selection logic (e.g. selection algorithm) to identifying matching application components.

In one embodiment, a device may include firmware built in (or burned in) with an associated trait vector (e.g. as a hardware meta data) for publishing and/or describing device capabilities. As a result, the thinning mechanism may allow application variants to be generated and/or adapted without actual knowledge (e.g. lookup rules) of mappings between devices and device capabilities. A capability change on a device can induce the thinning mechanism to automatically generate an application variant adapted to an updated trait vector stored in the device.

Embedding the trait vector (e.g. true and appropriate capability features) in each device's firmware can simplify application development efforts. For example, resource lookup APIs can be built without needing the developer (or other system software components) to supply the correct lookup traits, which can be readily available (e.g. retrievable) from the device's embedded information.

Further, the mapping database storing the mapping information between devices and trait vectors can be trivially built and later extended by extracting trait vectors via enumerating all supported device firmware images (or build instructions). The mapping database can provide the information about individual devices to enable the processing components involved in the thinning mechanism. The thinning mechanism can reliably deliver trait vectors to the final processing component that does resource selection and culling. Thus, no code changes in the thinning processing components is required to accommodate changes such as the addition/removal of supported devices as well as updates to device traits.

In some embodiment, asset catalog in an application package submitted to an application store may include special buckets carrying components not needed during runtime. For example, the special buckets may include a version of icon designed with a proper size to be displayed in the application for application identification. These components may be specially tagged. The thinning mechanism may filter out these specially tagged components from application variants.

In certain embodiments, a special application variant (e.g. place holder variant) may include only a place holder for a purchase token (e.g. authorization data). A device may execute the special applicant variant to download and install an application variant authorized via the purchase token. The place holder variant may be employed to represent an application while consuming a bare minimum of space (e.g. memory or storage space) in a device. Advantageously, the place holder may reside on a hub device (e.g. a laptop device, a desktop device or other applicable computer device) to facilitate the connection of multiple different target devices to the hub device. As a result, when a target device performs synchronization operations with the hub device, the target device may be allowed to download its appropriate device specific variant of an application from an application store based on the place holder (e.g. corresponding to the application) without requiring the hub device to keep all possible (and current and future) variants of the application stored locally.

In some embodiments, applications downloaded from an application store may be cryptographically signed using securely managed private keys. A target device may verify at installation time (and optionally, again at runtime) that an downloaded application was legitimately from the application store and has not been modified in transit or in situ (or on site). The thinning mechanism can allow the digital signature to cover not only the executable code of an application, but its resources as well.

For example, the thinning mechanism may generate multiple variants of an application and sign each variant independently (e.g. instead of signing the application before generating the variants). These multiple signatures can also be computed substantially in parallel with one another or concurrently, so as to mitigate the impact of the multiple signature operations on the overall processing time for the application.

FIG. 1 is a distribution diagram illustrating thinning a submitted application based on device traits for distribution. For example, a universal application may be developed in development device 101 by developer(s) to support multiple types of target devices. An integrated development environment running in device 101 can allow the developer to specify device capabilities as traits for created or assembled components of the application (e.g. application component).

Application package 103 may include a data structure or format carrying a variety of application components associated with different traits of target devices. Application package 103 may be submitted from development device 101 to application server 105, for example, via network connections between development device 101 and application server 105. An application store can publish the underlying application of application package 103 for different types of user devices to download and install (e.g. with an authorization via a purchasing process).

A thinning tool may be invoked in application server 105, during thinning time, to trim down application package 103 (e.g. including a universal application of one underlying application) into multiple application variants for multiple types of user devices (or target devices). Each application variant may carry a subset of application package 103 selected based on (e.g. matching) a trait vector of a type of target devices. These application variants may be pre-generated (e.g. based on a mapping between trait vectors and the types of target devices which are known already) and stored in application server 105 for retrieval/download at a later time. In some embodiments, the thinning tool may generate an application variant on the fly, for example, in response to a trait vector of a newly available type of devices. Development device 101 may run a copy of the thinning tool for testing purposes during build time of the application.

User device 109 may be coupled with application server 105 (e.g. via a network) to request or purchase the underlying application submitted via application package 103. In one embodiment, user device 109 can send an identifier or an associated trait vector to application server 105 to download a copy of the application. In response, application server 105 can identify a previously generated application variant 107 indexed with the trait vector of user device 109.

Application variant 107 may be packaged with a minimum set of application components which are preferred or applicable for device capabilities of user device 109. Application server 105 can send application variant 107 to user device 109 for installing and running the application. In some embodiments, during runtime, system components running in user device 109 may include application component selection logic to allow application components to be selected during runtime according to device capabilities in an identical manner as in the thinning tool during thinning time.

Figure 2:
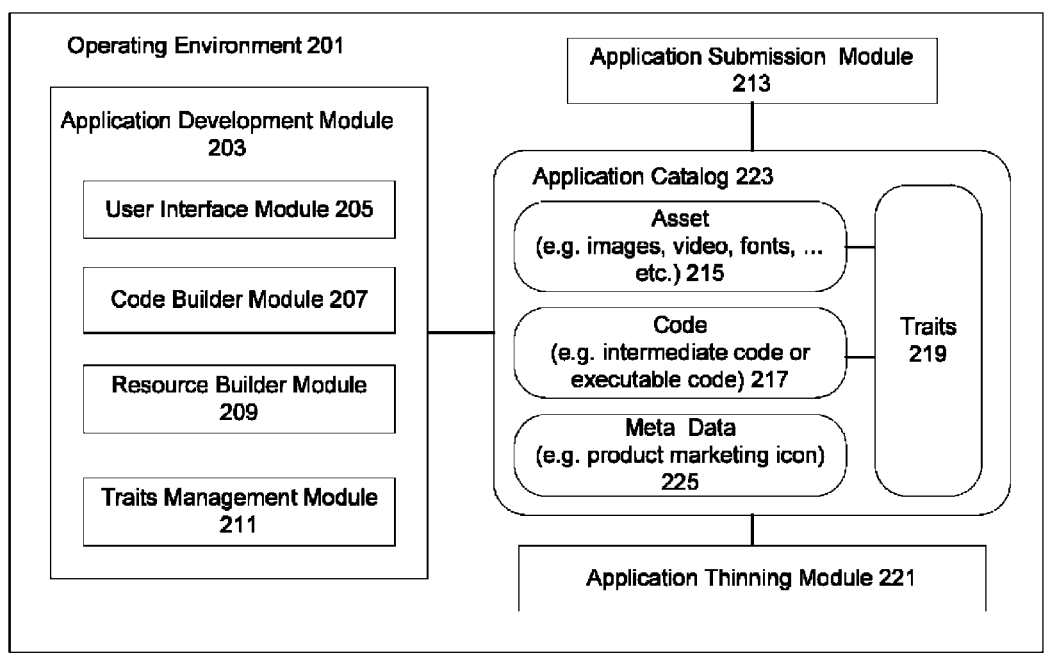
FIG. 2 is a block diagram illustrating a system to build an application according to capability attributes of target devices.

FIG. 2 is a block diagram illustrating a system to build applications according to capability attributes of target devices. For example, development device 101 of FIG. 1 may include some components of system 200 of FIG. 2. In one embodiment, operating environment 201 may include an operating system running in a development machine, such as a desktop computer, a workstation or other applicable development device. Application development module 203 may provide an integrated application development environment for a developer to develop applications to be installed and running in target devices of various form factors, such as wearable devices (e.g. watches), phone devices, television devices, mobile devices or other applicable user devices.

For example, a developer can build various application components for an application via user interface module 205. In one embodiment, code builder module 207 can allow a developer to write or develop source codes which can be compiled into binary codes, intermediate code or other applicable code representing executable code for an application. Resource builder module 209 can allow a developer to specify, design and/or configure resources, assets or other applicable data to be used during runtime of an application. Traits management module 211 can allow a developer to associate, assign or setup device capabilities for application components (e.g. individually) without a need to manage interdependencies on device capability requirements among different application components for a target device.

In one embodiment, application development module 203 may package application components generated for an application into application catalog 223 organized into various buckets. For example, application catalog 223 may include multiple asset buckets, such as asset 215, to carry data files (e.g. images, video, fonts, etc.) to be accessed during runtime of the application. Each asset bucket may correspond to one named asset data.

According to certain embodiments, the application may invoke an API during runtime passing a name parameter identifying an application component. Different application components may be distinguished via separate names carried in separate buckets (or categories). For example, code 217 may include an executable code bucket carrying different versions of machine codes targeting device capabilities related to different hardware platforms (e.g. processor, chip sets etc.).

Asset 215 may include an asset bucket carrying multiple versions or varieties of the same named application asset associated with different traits 219. The association may be implicit or explicitly embedded in application catalog 223. In one example, the association may be based on naming conventions of a data file. For example, the data file may be named as foo@2x.png to indicate an image asset for a named application component "foo" associated with "2x" screen resolution device capability. Alternatively, the association may be explicitly specified via application catalog 223. Meta data 225 may include application data which may be needed or used during runtime of the application, such as a marketing icon used in an application store.

In one embodiment, application thinning module 221 can generate an application variant from application catalog 223 based on a trait vector of a test device coupled with system 200. The application variant may be generated for testing purpose during build time. Application submission module 213 can send application catalog 223 (e.g. including application components for multiple types of devices) to an application server once development of the application is completed.

Figure 3:
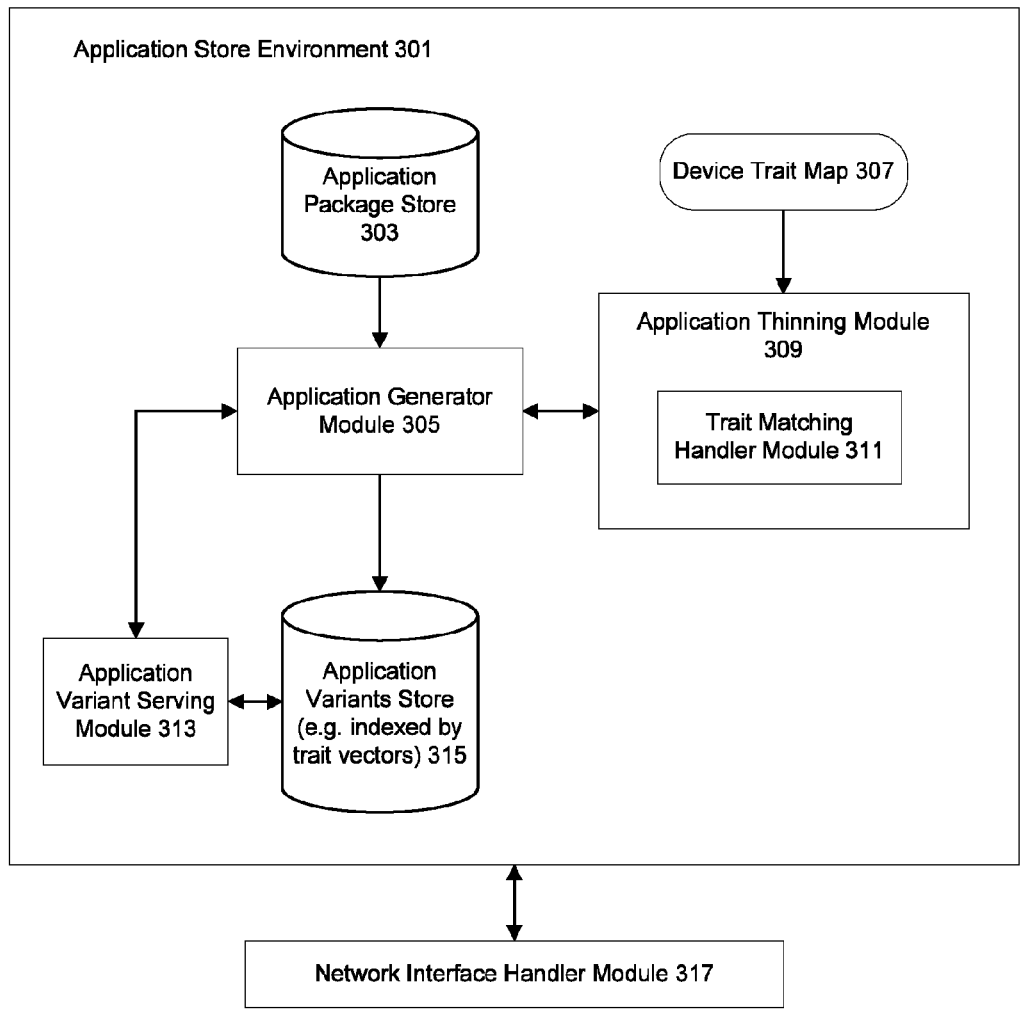
FIG. 3 is a block diagram illustrating a system to generate application variants from a universal application according to capability attributes.

FIG. 3 is a block diagram illustrating a system to generate application variants from a universal application according to capability attributes. For example, application server 105 of FIG. 1 may include some components of system 300 of FIG. 3. In one embodiment, application store environment 301 can receive application packages, such as application package 103 of FIG. 1, submitted from developers via network interface handler module 317. Application packages received may be stored in application package store 303 which may include a database, a data storage device or other applicable storage mechanisms. An application package stored in application package store 303 may have been verified and/or authorized (e.g. signed off with a certificate attached) via application store environment 301.

In one embodiment, application generator module 305 can invoke application thinning module 309 to thin down an application package retrieved from application package store 303. Application thinning module 309 may include a thinning mechanism to generate multiple application variants each tailored for a different trait vector representing device capabilities for a different type of target devices. Trait matching handler module 311 may determine or select a subset of application components from an application package to generate an application variant which best matches (e.g. based on heuristic measures) a trait vector corresponding to a type of target device.

In one embodiment, different types of device may be associated with corresponding trait vectors configured in device trait map 307 (e.g. device<->trait vector mapping database). Application thinning module 309 can generate application variants according to device trait map 307. Updates on existing devices and/or introduction of new devices in the future may cause changes in device trait map 307. Application generator module 305 may re-invoke application thinning module 309 to generate updated application variants (e.g. automatically) according to changes in device trait map 307 without a need for a new submission of an application package.

Application generator module 305 may store application variants generated via application thinning module 309 into application variants store 315. Each application variant may be indexed with a corresponding device trait and/or an application identifier. Application variant serving module 313 may identify an application variant in response to an application request received from a user device to download an application. The application request may include an identifier for the application and/or a trait vector associated with the user device for retrieving the application variant from application variant store 315. Alternatively, the application request may include a device identifier associated with the corresponding trait vector via device trait map 307. Application variant serving module 313 may send the identified application variant to the user device in response to the application request.

Figure 4:
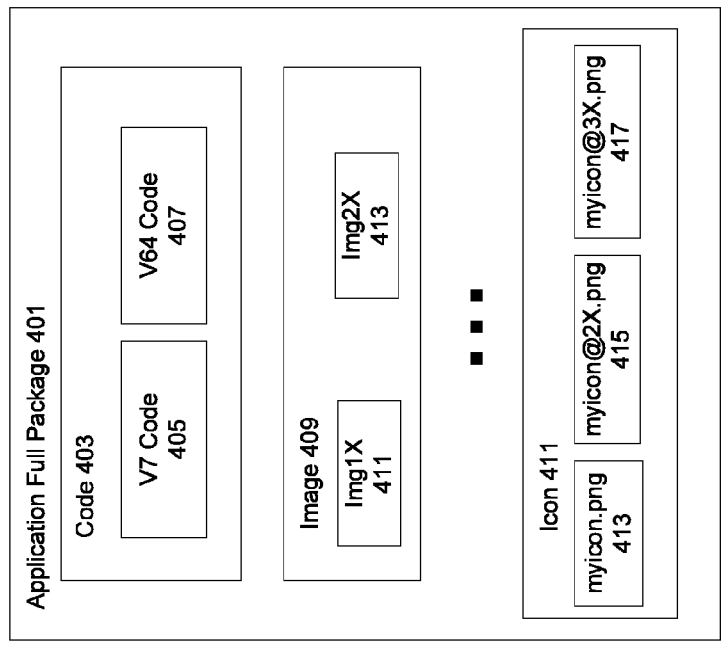
FIG. 4 illustrates one example of an application variant thinned down from a universal application.

FIG. 4 illustrates one example of an application variant thinned down from a universal application. Example 400 may be based on some components of system 300 of FIG. 3. Application full package 401 may include a universal application as an application package submitted via a development device. For example, application full package may include multiple buckets such as code 403, image 409 and icon 411.

Code 403 may carry different versions of executable code for the application. For example, V7 code 405 and V64 code 407 may be compiled from a common source code for the application to target a V7 processor based device and a V64 processor based device respectively. In one embodiment, the application may include an icon named as "myicon" for a user interface as an application component. A designer may provide three different kinds of this icon tailored for different screen resolutions separately as named files "myicon.png", "myicon@2x.png", "myicon@3x.png" arranged within one bucket. For example, Icon 411 may carry three versions of named application assets myicon.png 413, myicon@2x.png 415 and myicon@3x.png 417 corresponding to these named files respectively. Image 409 may include a bucket carrying different image files tailored for different screen resolutions (e.g. traits or a device capabilities) as img1x 411, img2x 413 and img3x 415 respectively.

Application variant 419 may represent a thinned application or an applicant variant selected from application components of application full package 401 according to a trait vector of a target type of devices. The trait vector may indicate a level of device screen resolution as "3X" and a version of processor as 64. A thinning mechanism can walk through the application components and the trait vector and select one component from each bucket from application full package 401 to best match the trait vector. Application variant 419 may be packaged as a catalog of buckets in a format similar to application full package 401.

For example, code 421 may include V64 code 407 which matches processor version 64 in the trait vector. Image 423 may carry Img2X 413 which best matches the screen resolution level "3X" between Img1X 411 and Img2X 413. Icon 425 may carry myicon@3X.png 417 which matches exactly the screen resolution level "3X". The thinning mechanism may extract traits embedded within associated names of the application components for selection comparison.

In some embodiments, an application variant 419 may be arranged in a manner to reduce fall back processing during runtime for system code to select best matching application component. For example, a target device may download application variant 419 to run an application. During runtime (e.g. running V64 Code 407), an API may be invoked to access a data file "img" from assets installed for the application via application variant 419. In response, system code may search for a data file named "img3x" which best matches capabilities of the target devices. The system code may fall back for "img2x" when "img3x" cannot be located. In some embodiments, application variant 419 may be installed to reduce fall back processing of the system code. For example, "img2x" may be pushed to a bucket number which can be located by the system code when searching for an asset identified via "img" without a need to performing fall back processing. The thinning tool can leverage a priori knowledge about resource selection in runtime via device capabilities to aggregate application components in a category file for optimized resource lookup behavior by the system code.

FIG. 5 is a flow diagram illustrating one embodiment of a process to generate an application variant from a universal application package. Exemplary process 500 may be performed by a processing logic, including, for example, some components of system 200 of FIG. 2 or system 300 of FIG. 3. At block 501, the processing logic of process 500 can provide a package of components for installing an application to different types of devices. Different types of devices may be characterized by a collection of attributes. Each attribute may be related to a property or capability of a device. Each attribute may be associated a set or a range of possible attribute values. The collection of attributes may be configured or updated to reflect changes of hardware or device technologies.

In one embodiment, each component for installing the application may be associated with a set of component traits. Each component trait may indicate an attribute value for an associated attribute. Each type of devices may be characterized by a set of device traits. Different types of devices may correspond to separate sets of device traits. A device trait may indicate an attribute value for one of the attributes associated with a device or a type of device.

The package of components for installing an application may include one or more components or application components. Each component may correspond to structured data or executable code. For example, the package may include a group of components representing resources or assets to be accessed by the application during runtime. The package may include a component carrying at least one executable code of the application.

In one embodiment, the executable code may include API (application programming interface) calls referencing a resource via a resource name. Different components representing different versions of a common resource may be associated with different variations of the resource name. The API calls may be associated with a group of device traits characterizing the device capabilities of, for example, a hosting device running the application. Implementation of the API calls (e.g. via system code running in the devices) can identify or select matching (or best matching) component among multiple components represented by different variations of a common resource name according to the associated device traits of the API calls.

At block 503, the processing logic of process 500 can identify a subset of the package of components as an application variant to install the application to a particular type of devices. The particular type of devices may be characterized by a particular set of device traits. In some embodiment, one of a group of components may be required to install the application to each different type of devices. The group of components may correspond to, for example, various designs or alternative implementations of a resource to be accessed by the application during runtime.

The processing logic of process 500 may select one component from a group of components corresponding to one asset or resource of the application to best match the particular set of device traits characterizing the targeted devices. The application variant for the targeted devices may include the selected component in the subset of the package of components. The application variant may include executable code to access the asset or resource of the application during runtime.

In some embodiment, a package of components submitted for an application may be partitioned into one or more partitions of components. Each partition may correspond to an asset or an executable required for installing the application. For example, a partition may include a bucket of components packaged in the submitted application.

In one embodiment, at most one of each partition of components may be required for installing the application to each type of devices components. A partition of components may not be needed for a certain type of devices. For example, an asset may be accessed by a specific library routine which may not be available for all hardware platforms of target devices.

A collection of attributes associated with component traits and/or device traits may include an architecture attribute for indicating different types of processor hardware of target devices. A particular partition of the components may include one or more components corresponding to different variation of executable code for the application. Each executable code may have a different attribute value associated with the architecture attribute.

These executable codes (e.g. components in this particular partition) may be built based on a common source code of the application, for example, to support different types of processor hardware of the devices. For example, the architecture attribute can indicate whether a target type of devices is based on 32-bit processor hardware or a 64-bit processor hardware. Optionally, the architecture attribute may indicate different version numbers of a same family of processor hardware.

In one embodiment, the processing logic of process 500 can generate matching scores for component selection or identification based on device traits and component traits. A matching score may be calculated between a set of component traits associated with a component and a set of device traits associated with a type of target devices. The calculation may be based on number comparison (e.g. differences in version numbers, screen resolution levels supported, or whether two character strings matches or no, etc.). The processing logic of process 500 may select one component from a partition of components for generating an application variant according to the matching scores (e.g. minimum distance, or whether a match occurs, etc.).

For example, the processing logic of process 500 can determine common attributes between a set of component traits associated with a component and a set of device traits of target devices. The processing logic of process 500 may assign a matching value between a component trait and a device trait, for example, associated with a common attribute or a different attribute. A default device trait may be employed if an attribute value for the corresponding attribute is not explicitly specified in the set of device traits.

A matching value may be assigned based on a comparison between a component trait and a device trait associated with a common attribute. The comparison may indicate whether two values are identical (e.g. exact matching), whether two values are within a range between each other, whether the two values satisfy a specific constraint (e.g. to ensure backward compatibility among different version numbers), or other applicable relationships. An attribute value for an attribute may belong to a finite set of possible values (which may be a number, a string or other applicable values). A result of the comparison may be based on a set of rules configured, for example, to indicate preferences or constraints between a component trait and a device trait.

The matching score for a component may be obtained based on a combination (e.g. summation, or other applicable combining functions or mechanism) of the matching values assigned for its associated components traits. In one embodiment, the matching score may indicate none of the components in a partition of components (e.g. in a bucket of an application catalog) should be selected. For example, a set of device attributes may indicate a device is configured without a certain library to invoke an asset designed to be used by the missing library. The resulting matching score may indicate non-selection via, for example, a threshold value (e.g. non-selection below the threshold value).

At block 505, the processing logic of process 500 can store the application variant in a data store indexed by a set of device traits. The application variant may include a subset of components identified based on the set of device traits for the application. The processing logic of process 500 can retrieve the application variant from the data store and send the retrieved application variant to a device characterized by the set of device traits at block 507. The processing logic of process 500 can determine the device traits of the device based on, for example, identifiers received from the device.

Figure 6:
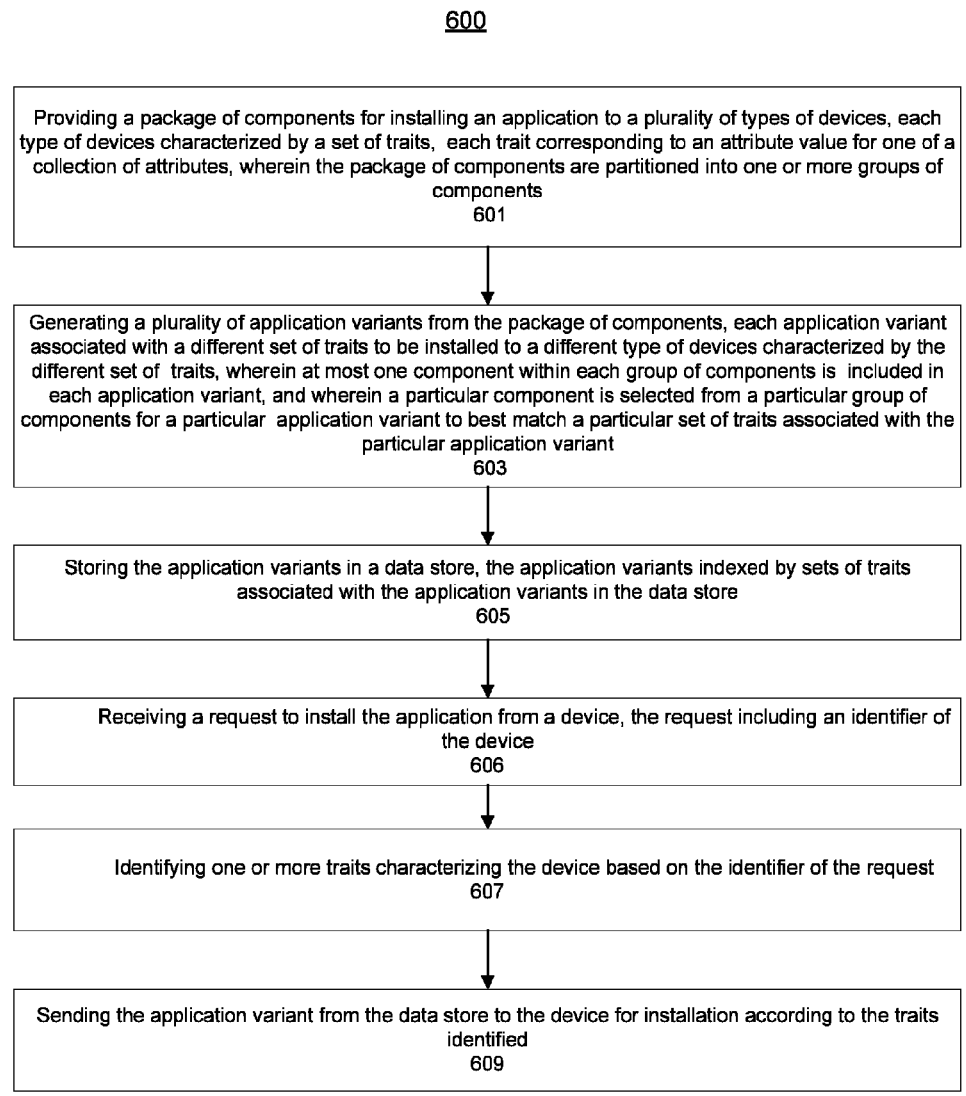
FIG. 6 is a flow diagram illustrating another embodiment of a process to provide application variants for target devices according to capability attributes.

FIG. 6 is a flow diagram illustrating another embodiment of a process to provide application variants for target devices according to capability attributes. Exemplary process 600 may be performed by a processing logic, including, for example, some components of system 300 of FIG. 4. At block 601, the processing logic of process 600 can provide a package of components for installing an application to a plurality of types of devices, each type of devices characterized by a set of traits. Each trait may correspond to an attribute value for one of a collection of attributes characterizing properties of a target device. The package of components may be partitioned into one or more groups of components, for example, structured as buckets in a catalog of data.

At block 603, the processing logic of process 600 can generate a variety of application variants thinned down from the package of components. Each application variant may be associated with a different set of traits to be installed to a different type of devices characterized by the different set of traits. In one embodiment, at most one component within each group of components may be included in each application variant. One component may be selected from a group of components for an application variant to best match a set of traits associated with the particular application variant.

At block 605, the processing logic of process 600 can store the pre-generated application variants in a data store (e.g. a database or applicable storage structure). The application variants may be indexed by associated sets of traits in the data store. At block 606, the processing logic of process 600 may receive a request to install the application from a device. The request may include an identifier of this device.

At block 607, the processing logic of process 600 can identify traits characterizing the requesting device based on the request. For example, the processing logic of process 600 can map a device identifier received from the request to a corresponding set of traits for the device based on a configured mapping data between device types and associated sets of traits. In some embodiments, the set of traits associated with the device may be retrieved directly from the device. At block 609, the processing logic of process 600 can sending the application variant from the data store to the device for installation according to the traits identified.

Figure 7:
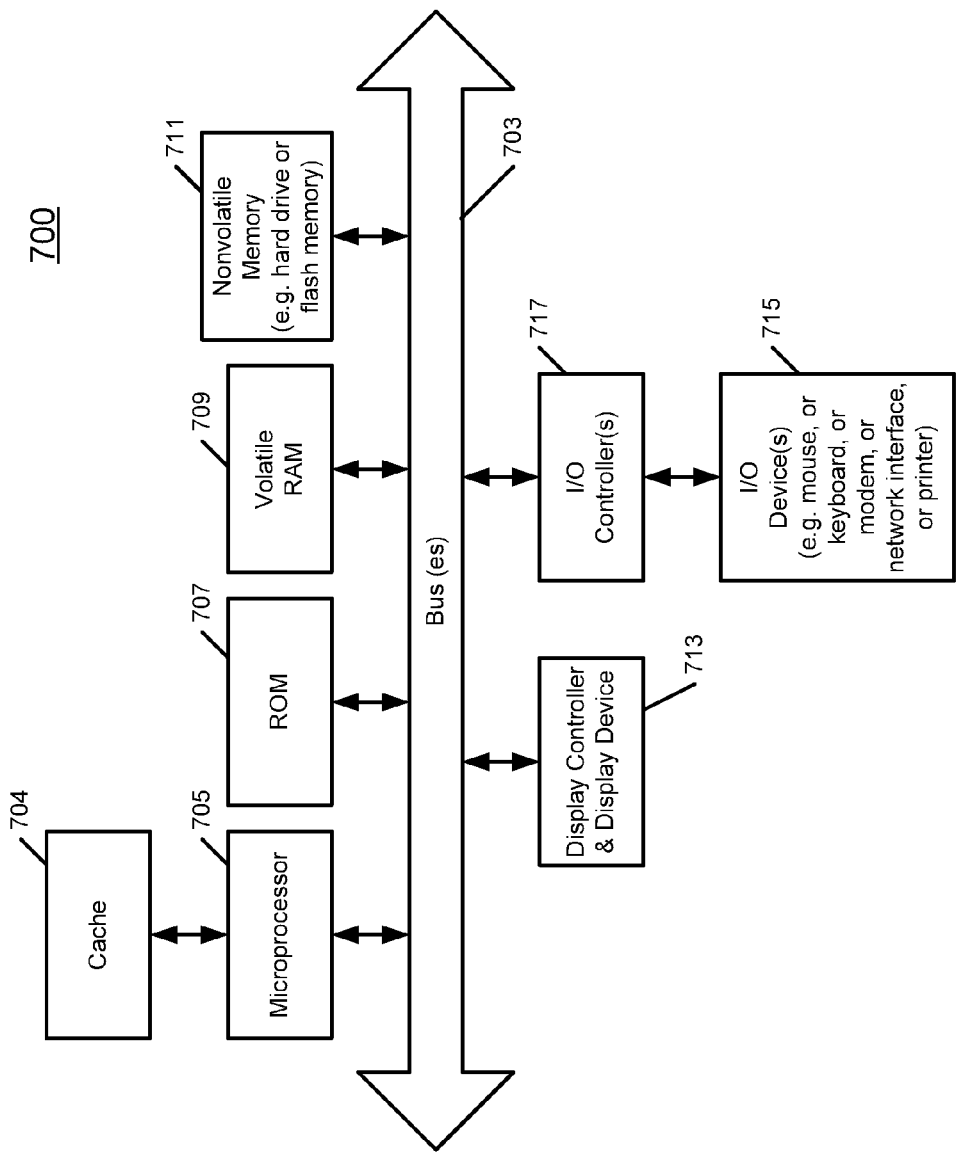
FIG. 7 illustrates one example of a data processing system such as a computer system, which may be used in conjunction with the embodiments described herein.

FIG. 7 shows one example of a data processing system, such as a computer system, which may be used with one embodiment the present invention. For example, system 200 of FIG. 2 and/or system 300 of FIG. 3 may be implemented as a part of the system shown in FIG. 7. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the scope of the invention.

What is claimed is:

1. A machine-readable non-transitory storage medium having instructions therein, which when executed by a machine, cause the machine to perform a method, the method comprising:
   providing, by a server, a package of components for installing an application to different types of devices, wherein a collection of attributes characterize properties of the types of devices,
      each component associated with a set of component traits, each component trait indicating an attribute class value for one of the attributes, and
      each type of device characterized by a corresponding set of device traits, each device trait indicating an attribute class value for one of the attributes;
   identifying a particular variant of a component within the package of components to install a variant of the application to a particular type of device, wherein identifying the particular variant includes,
      for each of a plurality of variants of the component;
         comparing the attribute class value for each component trait and the corresponding attribute class value for each corresponding device trait of the particular type of device;
         assigning a matching value between each component trait and the corresponding device trait of the particular type of device based on the comparison of class values; and
         determining a multiple trait matching score between the variant of the component and the particular type of device based on the assigned matching values, and
      determining based on the multiple trait matching scores, the particular variant amongst the plurality of variants to best match the particular type of device;
   storing the application variant including the particular variant of the component in a data store, the application variant indexed by device traits in the data store; and
   sending the application variant to a device from the data store as part of an installation process initiated by the server in response to receiving a request by the device to install the application on the device, wherein the device includes one or more device traits associated with the application variant.

2. The medium of claim 1, wherein the particular variant of the component represents a resource to be accessed by the application when running in the particular type of device during runtime, and wherein the application variant includes executable code to access the resource.

3. The medium of claim 2, wherein the executable code includes API (application programming interface) calls referencing the resource via a resource name, wherein each of the plurality of variants of the component is associated with a different variation of the resource name.

4. The medium of claim 2, wherein the application variant is sent to the particular type of device by sending only the particular variant of the component and not any remaining variants of the plurality of variants of the component.

5. The medium of claim 1, wherein the package of components is partitioned into one or more partitions of components, wherein at most one of each partition of components is required for the installation of the application to each type of device, and wherein the plurality of variants of the component corresponds to one of the partitions of components.

6. The medium of claim 5, wherein the collection of attributes include an architecture attribute for indicating different types of processor hardware of the devices, wherein a particular one of the partitions of components includes one or more components having different attribute values of the architecture attribute, each component corresponding to a different executable code for the application, each executable code built based on a common source code to run the application in devices of one of the different types of processor hardware corresponding to the executable code.

7. The medium of claim 5, wherein the architecture attribute has at least two attribute values separately indicating a 32-bit processor hardware and a 64-bit processor hardware.

8. The medium of claim 5, wherein the architecture attribute has at least two attribute values separately indicating different versions of a processor hardware.

9. The medium of claim 1, wherein identifying a particular variant of a component within the package of components includes,
comparing the attribute class value for each component trait and each attribute class value for each device trait of the particular type of device,
assigning the matching value between each component trait and each of the device traits of the particular type of device based on the comparison of class values, and wherein the multiple trait matching score is determined via a multidimensional comparison based on the assigned matching values.

10. The medium of claim 1, wherein the multiple trait matching score is determined based on common attributes between the component traits and the device traits of the particular type of device.

11. The medium of claim 1, wherein the attribute class values are associated with a finite set of possible attribute class values, and the comparison is based on a set of rules provided to specify numbered ordering relationships among the set of possible attribute class values.

12. The medium of claim 11, wherein the set of possible attribute values include version numbers and wherein the ordering relationships are defined according to backward compatibility among the version numbers.

13. The medium of claim 1, wherein the generation of the plurality of application variants comprises:
signing each application variant independently with a separate signature, wherein multiple signatures of the application variants are computed substantially in parallel with each other.

14. The medium of claim 1, wherein identifying a particular variant of a component within the package of components further comprises:
for each of the plurality of variants of the component,
determining the attribute class value for one or more device traits of the particular type of device satisfies a compatibility constraint, wherein the compatibility constraint requires a predefined minimum attribute class value to install the corresponding variant of the component on the particular device, and wherein if the attribute class value does not satisfy the compatibility constraint, the corresponding variant is eliminated as the particular variant for installing the application to the particular type of device.

15. The medium of claim 1, wherein assigning the matching value between each component trait and the corresponding device trait of the particular type of device includes determining a difference between class values of the component trait and the corresponding device trait.

16. The medium of claim 15, wherein assigning the matching value between each component trait and the corresponding device trait of the particular type of device includes determining whether the attribute class values are within a range of each other.

17. The medium of claim 15, wherein determining a multiple trait matching score includes performing a summation of the assigned matching values.

18. A computer system comprising:
a memory storing instructions;
a data storage; and
a processor coupled to the data storage and the memory to execute the instructions from the memory, the processor being configured to cause the system to perform operations comprising:
providing a package of components for installing an application to different types of devices, wherein a collection of attributes characterize properties of the types of devices,
each component associated with a set of component traits, each component trait indicating an attribute class value for one of the attributes, and
each type of device characterized by a corresponding set of device traits, each device trait indicating an attribute class value for one of the attributes;
identifying a particular variant of a component within the package of components to install a variant of the application to a particular type of device, wherein identifying the particular variant includes,
for each of a plurality of variants of the component:
comparing the attribute class value for each component trait and the corresponding attribute class value for each corresponding device trait of the particular type of device;
assigning a matching value between each component trait and the corresponding device trait of the particular type of device based on the comparison of class values; and
determining a multiple trait matching score between the variant of the component and the particular type of device based on the assigned matching values, and
determining based on the multiple trait matching scores, the particular variant amongst the plurality of variants to best match the particular type of device;
storing the application variant including the particular variant of the component in a data store, the application variant indexed by device traits in the data store; and
sending the application variant to a device from the data store as part of an installation process initiated by the system in response to receiving a request by the device to install the application on the device, wherein the device includes one or more device traits associated with the application variant.

19. A machine-readable non-transitory storage medium having instructions therein, which when executed by a machine, cause the machine to perform a method, the method comprising:
  providing, by a server, a package of components for installing an application to different types
    of devices, wherein a collection of attributes characterize properties of the types of devices,
      each component associated with a set of component traits, each component trait indicating an attribute class value for one of the attributes, and
      each type of device characterized by a corresponding set of device traits, each device trait indicating an attribute class value for one of the attributes;
  identifying a particular variant of a component within the package of components to install a variant of the application to a particular type of device, wherein identifying the particular variant includes,
    for each of a plurality of variants of the component;
      determining the attribute class value for one or more device traits of the particular type of device satisfies a compatibility constraint, wherein the compatibility constraint requires a predefined minimum attribute class value to install the corresponding variant of the component on the particular device;
      comparing the attribute class value for each component trait and the corresponding attribute class value for each corresponding device trait of the particular type of device;
      assigning a matching value between each component trait and the corresponding device trait of the particular type of device based on the comparison of class values; and
      determining a multiple trait matching score between the variant of the component and the particular type of device based on the assigned matching values, and
    determining based on the multiple trait matching scores, the particular variant amongst the plurality of variants to best match the particular type of device;
  storing the application variant including the particular variant of the component in a data store, the application variant indexed by device traits in the data store; and
  sending the application variant to a device from the data store as part of an installation process initiated by the server in response to receiving a request by the device to install the application on the device, wherein the device includes one or more device traits associated with the application variant.

20. The medium of claim 19, wherein if the attribute class value does not satisfy the compatibility constraint, the corresponding variant is eliminated as the particular variant for installing the application to the particular type of device.

* * * * *